United States Patent [19]

Lingafelter

[11] Patent Number: 5,755,072
[45] Date of Patent: May 26, 1998

[54] CONSTRUCTION METHOD

[76] Inventor: Kenneth Lingafelter, 4444 S. Delaware Ct., Englewood, Colo. 80110

[21] Appl. No.: 645,167

[22] Filed: May 13, 1996

[51] Int. Cl.$^6$ .................................................. F04G 21/16
[52] U.S. Cl. ..................... 52/741.1; 52/745.09; 364/512
[58] Field of Search ................... 52/741.1, 105, 52/745.09; 33/1 G, 18.1; 364/512; 29/407.09, 407.1

[56] References Cited

U.S. PATENT DOCUMENTS

| | | | |
|---|---|---|---|
| 3,628,232 | 12/1971 | Brewer | 52/105 X |
| 4,847,778 | 7/1989 | Daley | 364/512 X |
| 5,091,869 | 2/1992 | Ingram et al. | 364/512 X |
| 5,163,258 | 11/1992 | Habraken et al. | 52/745.05 |
| 5,227,983 | 7/1993 | Cox et al. | 364/512 |
| 5,291,717 | 3/1994 | Turner | 52/745.07 |
| 5,329,464 | 7/1994 | Sumic et al. | 364/512 |
| 5,557,537 | 9/1996 | Normann et al. | 364/512 |

*Primary Examiner*—Michael Safavi
*Attorney, Agent, or Firm*—Ramon L. Pizarro; Edwin H. Crabtree

[57] ABSTRACT

A construction method which includes marking layouts of installation locations directly on the floor of a building under construction. The layouts of the installations are marked directly on the floor of the building under construction by first providing architectural data that defines the architectural layout of a building to be constructed. From this architectural data a set of structural arrangement data is extracted and digitizing in order to allow computer processing the structural arrangement data to produce a digital representation of layouts of installation locations to be placed on the floor of a building at a construction site. This data is then automatedly marked, preferably directly on the floor of the construction site, by a automated robot marking machine or a large scale rendering machine to provide the layouts of installation locations of installation to be placed on the floor of the building at the construction site.

6 Claims, 5 Drawing Sheets

5,755,072

CONSTRUCTION METHOD

BACKGROUND OF THE INVENTION (a) Field of the Invention

This invention generally relates to the field of methods and systems for developing and laying out construction sites, and more particularly, but not by way of limitation, to a method and system for developing and marking layouts of structure and installations to be erected at a building site.

(b) Discussion of Related Art

The construction of a building typically begins with the design of the overall concept of the building by an architect. The architect designs the appearance and layout of the building in order to meet the needs of the intended occupants. The architect's design is then formalized and detailed in drawings which are used to construct the building according to the architect's concept.

The architect's drawings, or plans, for buildings such as framed residential buildings, will typically include a drawing of the overall outline, or envelope, of the building, including the location of the foundation on the lot. Another set of drawings will include the foundation plans, which define the shape and general requirements of the foundation. These foundation plans will typically be sufficiently detailed to allow the person who builds the foundation, the concrete contractor, to build the foundation with the features requested by the architect. However, the details of exactly how to go about carrying out the job, or how to lay out the forms and what forms to use to carry out the job are left to the contractor, who must furnish a completed job that meets the specifications defined by the Uniform Building Code (UBC). The UBC is a widely accepted codification of specifications for building construction.

After the foundation drawings, yet is another set of drawings supplied by the architect are used to build the structure of the building. This set of drawings is generally referred to as the building plans, and contain the locations of walls, installations, and elevations to be incorporated into the building. This set of drawings include the architectural data that is used to build the structure over the foundation.

Thus, after the foundation has been laid, a floor which is typically of concrete, wood or other suitable material is placed over the foundation. Then, typically another independent contractor, not the concrete contractor, begins to build the structure over the floor. This contractor is typically referred to the framing contractor.

The framing contractor reads the building plans and lays out the location of a reference piece of structure such as a wall that is common to all floors of the building. The wall is located and marked on the floor with chalk or pencil. Based on this marking, the framing contractor then reads the architect's drawings and transfers key features on to the floor by measuring out and marking the location of walls and other features, such as doors and windows. Then the framing contractor marks the location of special purpose rooms, such as bathrooms and kitchens, which may require special construction details that will have to incorporated at a later stage.

Thus the framing contractor reads the architect's drawings and transfers the important features from the drawings on to the floor over the foundation. Often the contractor has a few highly skilled individuals, such as foremen, who can faithfully interpret and transfer the information from the drawings on to the floor. To maximize productivity, these skilled individuals read the drawings and mark on the floor the location of the key structure in order to get the framing crew started on this structure. In other words, in order to ensure that everyone on the crew is producing, the foreman will mark as little information as possible, as quickly as possible, in order avoid having the crew wait for the foreman to completely detail the entire job. This pressure to produce, coupled with the requirement imposed on the framing contractor of having to interpret the architectural drawings and combine these requirements with the UBC requirements begin to set the stage for the occurrence of errors and inefficiencies in the construction process.

With the foreman's layout on the floor, the carpentry crew will then generally use one of two well known methods of developing the structure required to build the building as designed by the architect. The first method is to lay out the overhead and base plates (which are usually two-by-four pieces of lumber) to be used in building the frame for each wall of the structure. The overhead and base plates are placed along the marks made by the foreman. Then, the carpenters will transfer these marks on to the plates by making pencil marks along the plates. These marks indicate the location of studs within the frame for the wall.

The second method is to simply mark the location of the studs on the floor instead of on the plates. The carpenters will then simply follow these marks and build directly over the foreman's markings.

The location of each of the studs is important because the number and location of the studs will determine the structural soundness of the structure. The UBC defines the accepted minimum stud spacing depending on the type of wall. For example, if a bearing wall on the first floor of a multi story building is being built, then the UBC may indicate that the studs be placed at eight inch intervals. Alternatively, if a wall without special structural requirements is being installed, the studs will be placed at sixteen inch intervals.

Perhaps one of the most significant limitations to this method is that the number and position of the stud is determined by marking off locations that ensure compliance with local building codes and ordinances (which are typically the same as the UBC specifications) and to fulfil the requirements of the architect. Thus, after a wall has been located according to the architect's drawings, a carpenter will mark sixteen inch spacing which mark the locations of studs. Unfortunately, some carpenters may mark the location of the edge of a stud, while others may mark the center of the stud. Thus if one framing carpenter marks and begins to install studs, and a second carpenter takes over after the first, it is easily conceivable that the second may make errors due to his interpretation of the markings made by the first carpenter.

Still another limitation is that the architect's design is likely to be responsive to the limitations imposed by the client, owner, terrain, or size of lot. These limitations are unlikely to result in walls which have dimensions that are in multiples of eight. Thus, by spacing the studs at fixed intervals, beginning at one end of the wall, may lead to a crowding of studs at another end of the wall. Additionally, in a wall with a window or a door, for example, the framing carpenter may begin measuring sixteen inch intervals from the ends of the wall towards the window or door, and then resolve any accommodations for fulfilling UBC requirements with the structure incorporated around the window or door feature. He may achieve this, for example, by incorporating extra structure around a header or cripple incorporated around the window or door.

Thus it can be appreciated that the known method of framing can lead to errors or inefficient use of resources such as lumber. These errors and inefficiencies are in part due to the fact that the foreman or framing carpenter has to read and transfer the location of the structural features on to the construction site floor.

Another source of inefficiencies is that the framing personnel are trying to meet the requirements imposed by the architect's drawings and the requirements imposed by the UBC. Thus the framing personnel is not particularly concerned with how to provide a more efficient structure by, for example, ensuring that the studs installed at a lower floor line up with studs installed at upper levels. The framing personnel is usually motivated by the costs and schedule which must be followed in order to meet the requirements of the architect and the UBC. For this reason it is unlikely that the carpenter will strive for the optimal spacing of the studs to ensure that the studs are evenly spaced along the wall, without a concentration at one end.

After the framing contractor has installed the structure in order to meet the requirements of the Architect's drawings and the UBC, the electrical contractor generally interprets the architect's drawings and begins to install the electrical systems for the building. The electrical contractor also must meet the specifications of the architect and the UBC. However, the electrical contractor arrives at the construction site after the framing contractor has made a great deal of progress in building the structure. Since most of the framing structure has been built according to UBC and not by details from the architectural drawings (these details are typically not included in the architectural drawing, but left to the contractor to follow UBC conventions), the electrical contractor has to go to the field and install the electrical systems on to the structure as built.

Since the framing contractor has installed structure according to his interpretation of the architectural drawings, there are typically many errors in the as-built structure. These errors may be a simple misplacement of structure to an omission of a window or doorway. These errors will surface when the next contractor, the electrical contractor in this instance, comes on to the site looking for the structure on which he is to mount the electrical systems. Alternatively, in situations where excessive structure has been installed, the electrical contractor will encounter extra labor in installing the electrical systems. Still worse, many errors will require that the framing contractor tear down parts of an installation in order to allow proper installation of the electrical systems that follow.

While the electrical systems are being installed, the mechanical contractors will install the mechanical systems. These systems include the plumbing and the heating ventilation and air conditioning (HVAC) systems. The mechanical contractor, like the electrical contractor, will have to inspect the actual location of the existing structure as built by the framing contractor in order to install the mechanical systems. The framed installations will affect the routing and support of these systems. Thus errors in the framing will affect the mechanical contractor as well as the electrical contractor, even though the building has been made in accordance to UBC code.

The correction of the errors will mean additional expense as well as delays to all contractors. These delays and expenses caused by construction site errors give rise to expensive disputes and litigation, where each contractor tries to asses the blame to the other contractor or the architect.

Thus the need to devise a method and a system for marking the location of installations at a construction site has long been recognized as a means for solving the problem of inadvertent errors introduced while transferring the layout and structure from the architect's plans on to the floor at the construction site. However, attempts at solving the problems associated with marking these location have traditionally followed very similar, limited approaches. Tradition in the trade has taught that scaling off the location and the direction of the desired installations is the preferred method of marking before beginning the installation of the framed structure. These approaches have typically focused on ensuring a precise marking of the framer's interpretation of the architect's drawings. The flaw in this approach, however, is that the result is a precise marking of an erroneous interpretation.

Thus, a common approach at solving the problems associated with marking framing layouts has been to provide template like tools. For example, U.S. Pat. No. 4,499,666 to Smith teaches the use of a large scale that includes markings representing the common locations for, say window openings and doors. However, the Smith device still requires that the user read and interpret the blueprint drawings prepared by the architect and then transfer this information on to floor of the construction site. The Smith device is further disadvantaged in that users may tend to favor the layout arrangements imposed on the device rather than actually following the specifications of the architect. Moreover, with the use of a template, little emphasis is placed on allowing for structural optimization, meaning arriving at the strongest structure for a given amount and grade of materials.

Other examples of framing layout tools include U.S. Pat. No. 3,823,481 to Chapin, U.S. Pat. No. 4,212,108 to Jackson, and U.S. Pat. No. 5,239,762 to Grizzell. These tools are designed to provide templates and to aid in measuring distances along the floor area in order to mark layouts based on the architectural or shop drawings. These tools, however, still require that the user interpret drawings, and then transfer the information from these drawings on to the floor at the construction site. This kind of transfer is prone to resulting in errors by the person who is interpreting and transferring locations of the installations on to the floor. Also, these tools do not favor attempts at structural optimization, but merely focus on precise markings of interpretations of drawings.

Yet another approach at solving the problems associated with marking the locations of installations to be incorporated at the work site is taught in U.S. Pat. No. 5,195,247 to Wilcox, which teaches the use of a double roller device with a marking device to mark the locations of the desired installations. The Wilcox device does provide advantages in producing accurate long straight lines, but depends on the user's interpretation of the drawings and the user's skill in transferring these markings on to the construction site floor.

In still another approach at solving the problems associated with transferring layouts on to the floor of a construction site includes U.S. Pat. No. 4,202,108 to Adams, Jr. et al., which teaches the use of a layout tool which includes a plurality of elongate members adjustably secured together, and a plumb together with chalk line carrying means for marking lines on the construction site floor. This tool, however, still follows the method of requiring that the trades, with the framing contractor at the forefront, interpret and transfer these interpretations of the drawings on to the floor of the construction site. Moreover, they leave the UBC code compliance up to the trades, who must also bear the risk of properly interpreting the architect's drawings and the risk of having to later tear down installations which inadvertently do not comply with the UBC or the architect's requirements.

Thus there remains a need for a simple method and system for transferring layouts to the construction site floor in a reliable manner which is not prone to errors of interpretation of the architect's drawings by an individual. Moreover there remains a need for a precise marking method and device which can be easily set up and operated in the field.

Still further, there remains a need for a reliable system that allows structural optimization of the framing structure to be built, so that the structure meets UBC requirements and uses the materials used to provide the strongest practicable structure.

There remains a need for a system for generating framing layout markings that can be used by various trades, including the local construction inspection authorities, in order to better anticipate and plan for the as built structure that will be found at the construction site. There remains a need for a system and method for marking building site floors with the layouts of the structure to be built, without requiring the input of a significant amount of user judgment or interpretation.

SUMMARY

In light of the foregoing, a construction method has been discover and system has been developed. The method generally comprises the automated production of construction layout markings of installations directly on the floor of a construction site. More specifically stated, construction method consists of the following steps:

providing layouts of installation locations on the floor of a building under construction by the steps of:
  a) providing architectural data that defines the architectural layout of a building to be constructed;
  b) extracting structural arrangement data from the architectural data;
  c) digitizing the structural arrangement data;
  d) computer processing the structural arrangement data to produce a digital representation of layouts of installation locations to be placed on the floor of a building under construction; and
  e) automatedly marking the layouts of installation locations to be placed on the floor of the building under construction.

It is contemplated that the method be carried out by means of a self-propelled marking robot machine which can process the digital representations of the installation locations to produce marks on the floor at the construction site, the marks indicating the location of installations to be installed at the construction site. The marking robot includes means for accepting a set of digitized layout data, such as layout marking locations, from a set computer aided design drawing files or from a pre-programmed set of marking locations. The device also includes means for selecting a reference point from the digitized data and using this reference to orient itself on at least one reference point on the construction site. The device further includes means for driving the robot machine so that it may follow the digitized layout data that has been entered into the machine. At least one means for marking on the construction site is included with the robot machine so that the location of installations may be transferred to the construction site floor based on the digitized layout data that has been entered into the robot machine.

According to one preferred embodiment, the robot machine rides on a framework of guide rails. The guide rails are set up over the construction floor and provide a set of axes for referencing the motion of the robot machine.

According to a highly preferred embodiment the robot machine is a self contained, self propelled device which can accept instructions from a computer aided design format file. The robot machine can then interpret these files into line drawing format which can be used to guide the self propelled robot machine over the floor. Also, the robot machine will use this data to draw and layout the location of installations to be built on the building site.

It is also contemplated that the drawing of the layout of the installations to be built or installed could accomplished with a large scale rendering (LSR), large scale printing, machine. The large scale rendering machine would include a printing head mounted on a self propelled guidance/navigation system mounted on supporting members that mount over and around the floor that is to be marked. The guidance/navigation system would use information developed from the architectural data or drawings to control the printing on the floor at the construction site. The internal mechanism of the LSR system would include a servo motor with an encoder which controls the motion of the device by moving the device along a rack gear mounted on the supporting members. The motion of the servo motor would be controlled by a servo motor controller.

The printing by the self propelled robot machine as well as the printing carried out by the Large Scale Rendering (LSR) machine could be also be accomplished off-site over portable, full scale, overlays made of a strong paper or mylar, for example, that may be placed directly over the floor of the building under construction. However, it is preferred that the printing be carried out directly on to floor by a print head in the large scale rendering machine or in the self propelled robot machine. It is preferred that the indicia printed on the floor of the building under construction be marks that are widely accepted in the construction industry, such as the marks made while measuring and preparing for framing of the building.

According to yet another aspect of the invention, a method for marking layouts at a construction site by means of a self-propelled marking robot machine has been disclosed. The method is especially useful for marking the location of installations to be installed at the construction site, the method includes the steps of:

a) loading a set of digitized layout data into the marking robot machine from design data;
  b) selecting a reference point from the digitized layout data;
  c) marking at least one reference point on the construction site;
  d) orientating the marking robot on the construction site in relation to said reference point;
  e) driving the robot machine to follow the digitized layout data; and
  f) marking on the construction site with the robot machine the location of installation based on the digitized layout data.

It has been found that the disclosed system obviates the need to read blueprints or architectural drawings in order to later scale and transfer their content on to the floor of the construction site. The disclosed system is designed to take pre-programmed data to transfer markings indicating where installations are to be placed on the construction site floor.

The disclosed invention also provides new, useful advantages in precision of the layout. By including a robot machine marking apparatus that follows the location information developed from computer aided design drawing files one can provide precise markings on the construction site floor. These markings can then be used to guide tradesmen on the location of installations to be built over the floor.

From the above discussion it can be understood that the instant invention provides clear, accurate, complete, and detailed markings on the floor of the building under construction in order to guide the trades to the proper location of installations, and thus solves the problems associated with the interpretation of hand made pencil or chalk lines used in the prior art.

Also, the device may be used to transform or create original data files that have information on a specific kind of installation to be incorporated into the building. For example, one data file may include information on piping layouts to be marked on the building site floor. Another data file may include information on the location of internal wall partitions. Still yet another data file may include information on the routing and location of electrical circuits and devices to be incorporated into the structure. Moreover, a data file containing the heating ventilating and air conditioning lay-out may be derived from the original computer aided design drawings, and this data file used for marking the routing and installations for these systems.

It is contemplated that each of the systems may be marked in a specific, standardized color based on the data derived from the computer aided design file. Moreover, color coded legends may also be marked to indicate special warnings and reminders to the tradesmen making the installation. Thus it can be appreciated that with the marking and routing system taught herein one may bring down costs associated with reworking errors. Also, with the disclosed system one may obviate problems and disputes that arise when the owner or lending association does not trust that the building has been made according to plans.

It is also readily perceivable that the invention solves the clarity problems associated with devices that mark with non-permanent marking means, such as lines made with chalk dust and the like. Moreover, the disclosed invention may even be used to mark the location of installation and include legends and markings which can be easily read by tradesmen when making installing the elements of the building. Thus, with the disclosed invention the tradesman may, for example, read and verify that a certain line indicates the location of an internal doorway in a wall.

Still further, it can be appreciated that the invention solves the problems associated with devices that require skill for their use. Thus the disclosed invention provides a system that obviates the need to use highly skilled craftsmen extensively, and thus allowing the construction of housing at a lower cost.

It will should also be understood that the invention provides a very simple, but cost effective apparatus and method for improving the construction process. The disclosed invention would reduce or eliminate errors such as omitted installations, misplaced installations, and wrong size of materials (indicia would specify size of lumber, for example).

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
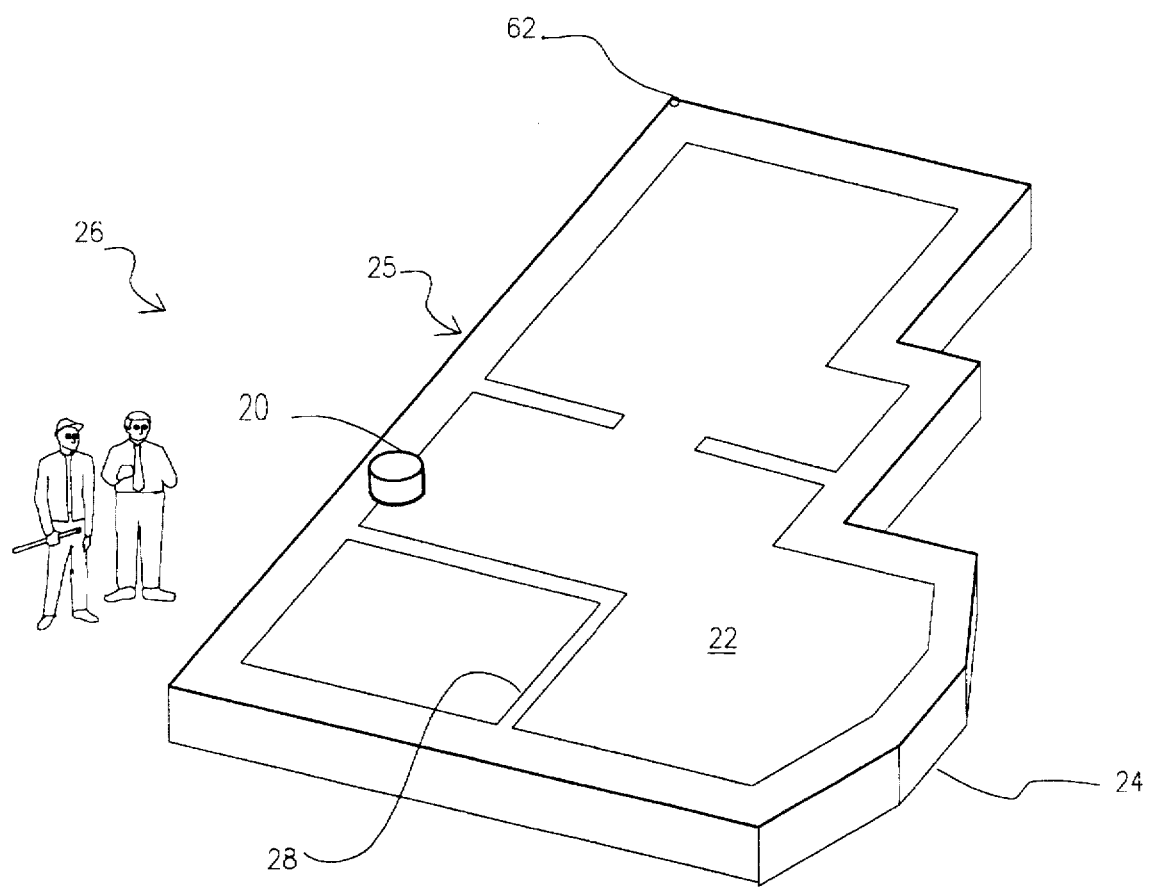
FIG. 1 shows a perspective view of a robot marking device automatedly marking the location of installations on the floor of a building under construction.
Figure 2:
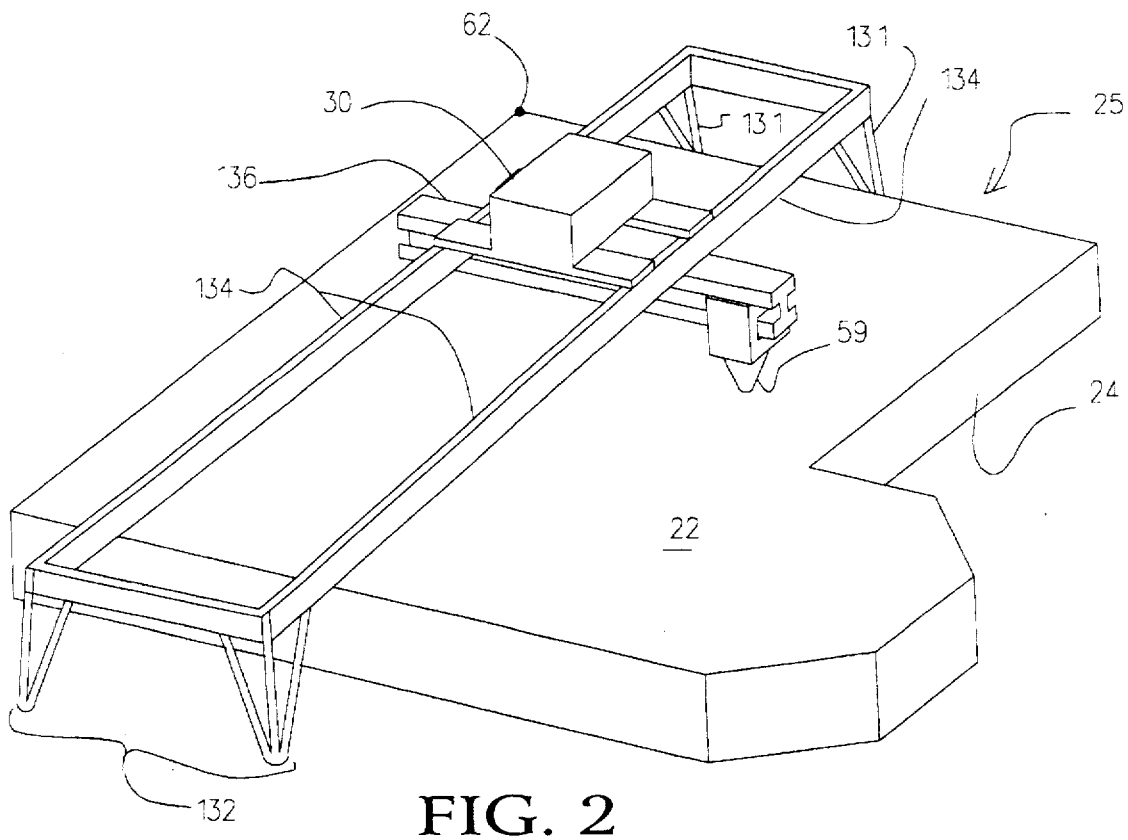
FIG. 2 shows a perspective view of a large scale rendering marking device, mounted on a support member, while it marks the location of installations on the floor of a building under construction.

Referring now to FIG. 1 which illustrates the use of a self propelled marking robot 20 over a floor 22, the floor being of wood, concrete or any other suitable material, on a foundation 24 of a building under construction 25 at a construction site 26. The self marking robot 20 is laying out markings 28, which indicate the location of installations to be built on the floor 22 of the building under construction 25. Similarly, on FIG. 2 a large scale rendering (LSR) apparatus 30 is shown mounted over the floor 22 on the foundation 24 of the building under construction 25. The LSR apparatus 30 shown is also being used to lay out markings 28 to indicate the location of installations to be built.

The LSR apparatus 30 includes a first set of supports 131 and a second set of supports 132, the first set of supports 131 and second set of supports 132 are mountable next to the foundation 24 of the building 25. Mounted between the first set of supports 131 and second set of supports 132 is a horizontal support 134 extending between the first set of supports 131 and second set of supports 132. Mounted on the horizontal support 134 is a marking head support 136. The marking head support 136 extends beyond the horizontal support and carries a marking head 59 that is movably mounted on the marking head support 136, so that the marking head 56 can travel on the marking head support 134 to a position beyond the horizontal support 134 when placing markings on the floor 22.

Thus the marking robot 20 and the LSR apparatus 30 serve as automated marking means for marking on the floor 22 of the building under construction 25 the location of the various structural components and other installations which will become part of the building. The automated marking means use data derived from architectural specifications which have been processed as discussed hereinbelow to produce markings that serve as working layouts etched directly on the floor 22 of the building under construction 25.

Figure 7:
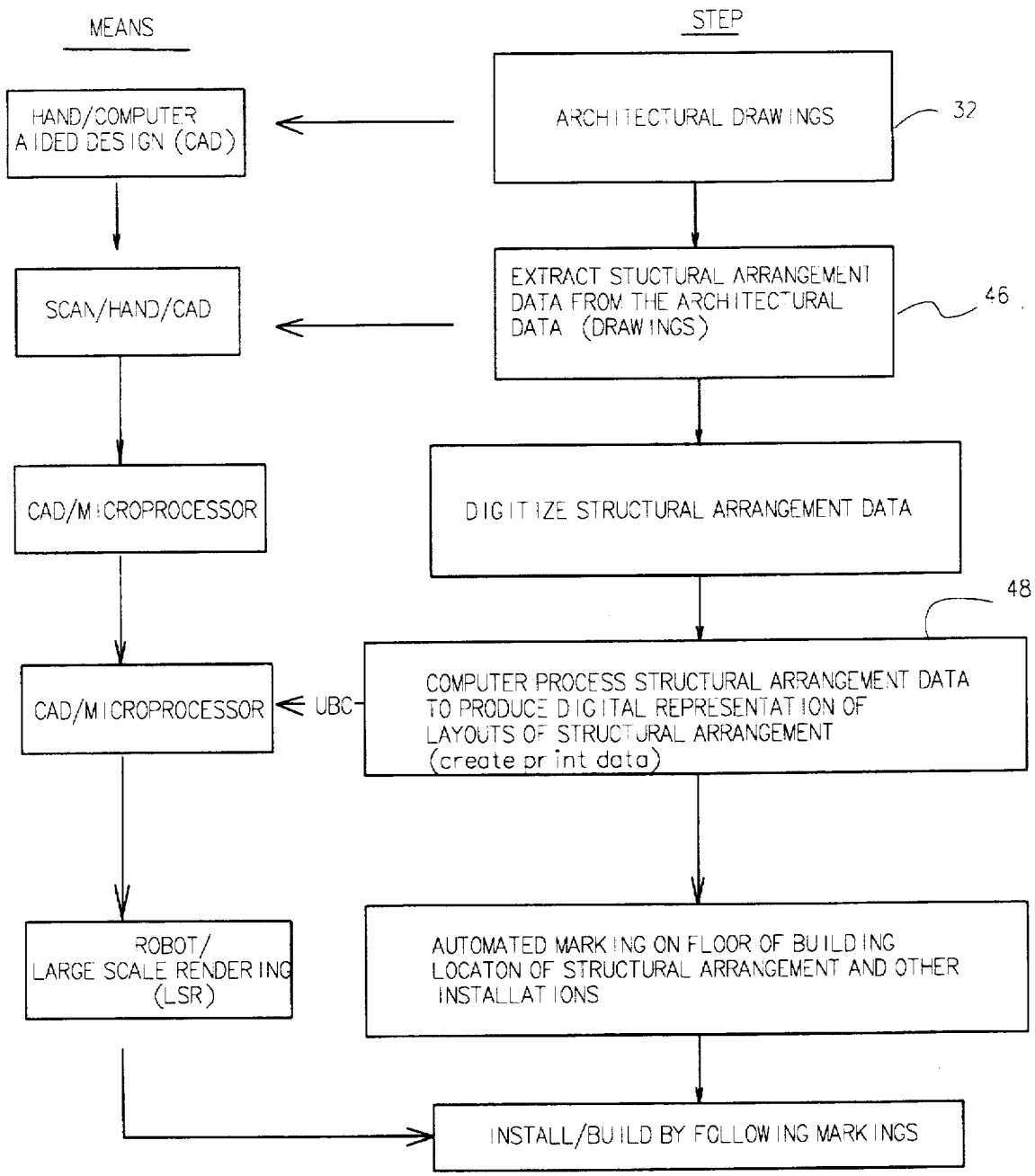
FIG. 7 is flow diagram showing the steps carried out and the means contemplated for carrying out the invention.

According to one aspect of the invention a construction method has been discovered which has been presented as a flow diagram in FIG. 7. As shown in FIG. 7 the process begins by providing architectural data 32, which typically comes in the form of architectural plans or drawings. It is contemplated that the architectural plans or drawings be according to accepted architectural drafting standards. Thus the disclosed construction method does not require that architects modify their traditional role in the design of buildings.

Figure 4:
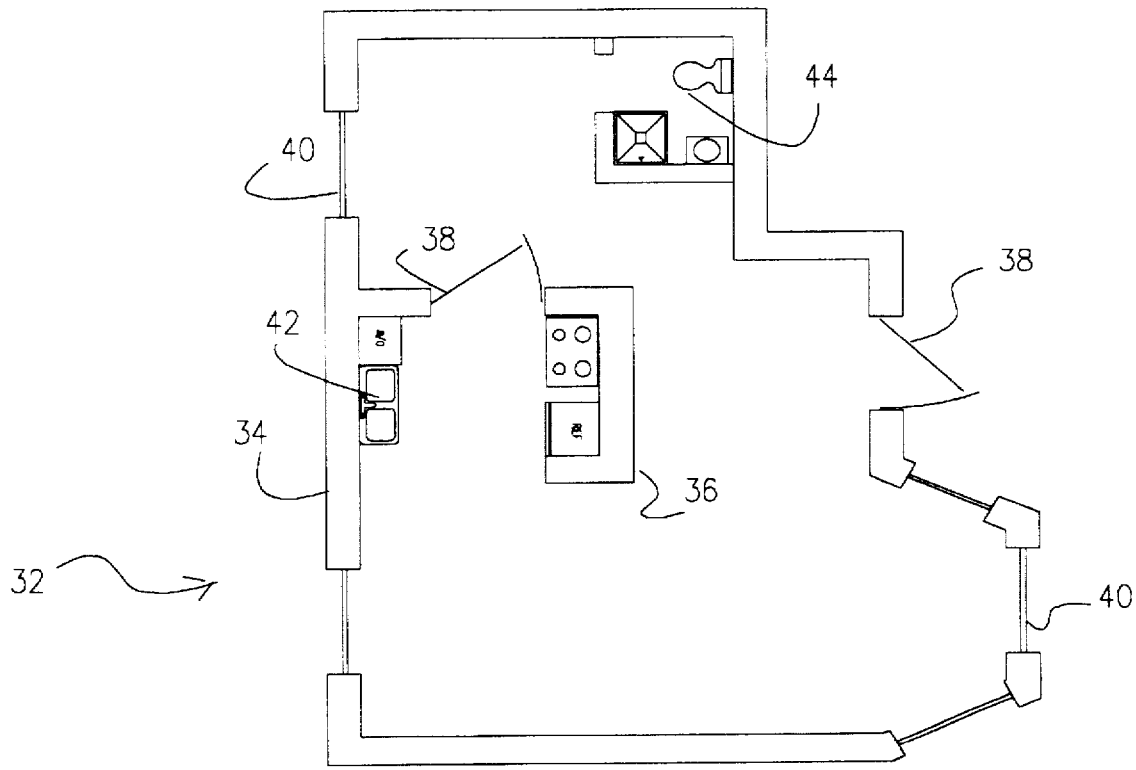
FIG. 4 is a depiction of typical features included in an architect's building plan showing the structure to be built.
Figure 5:
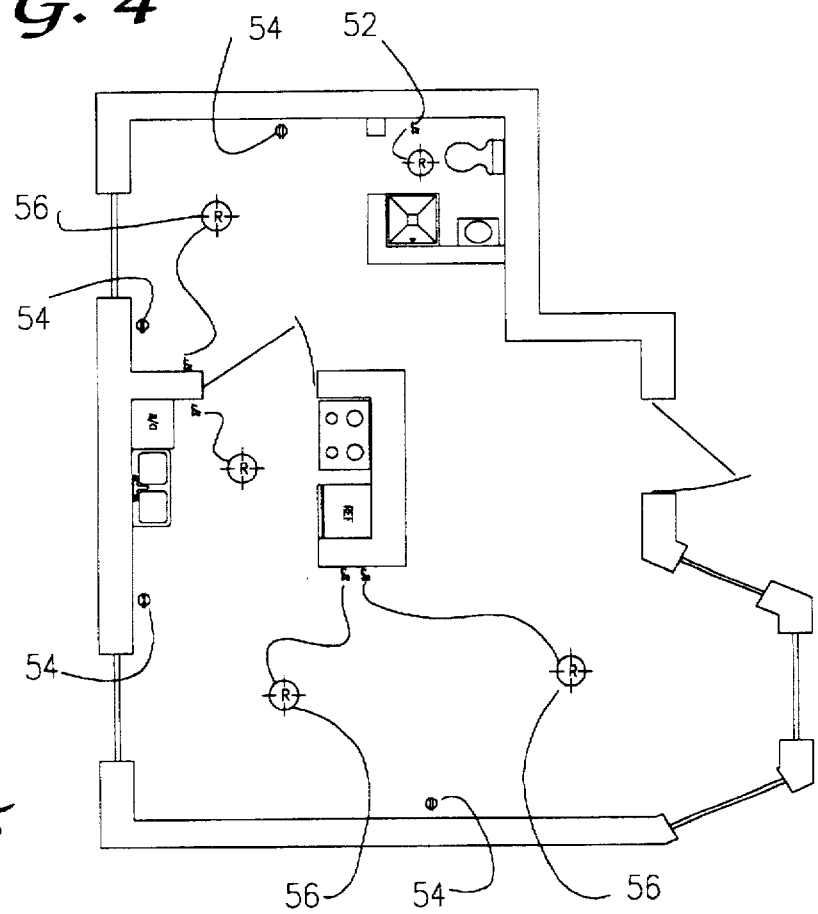
FIG. 5 is a depiction of typical features included in an architect's building plan showing the structure and the electrical installations to be incorporated into the building.

It is customary for architects to provide architectural drawings with the information shown on FIG. 4. As has been shown in FIG. 4, this information generally includes the location of structural installations, which include bearing walls 34, interior, non load bearing walls 36, doors 38, windows 40, and schematics indicating the location of kitchen installations 42 and bathroom installations 44. Another drawing showing the typical kind of information provided by the architect in the architectural drawings have been shown on FIG. 5, which shows the electrical installations in addition to the overall location of the structural installations.

The architectural data contained in the architect's drawings typically does not specify the precise location of studs, beams, trusses, joists, or other structural installations. Also, particularly in framed residential construction, the architect will also specify the grade of insulation, for example an R-19 value, as well as the depth and spacing of floor joists, and the type of materials used for walls and floors. Much of the precise detail of how members are connected together, or the exact location of the specific structural member is left to the framing contractor, or other responsible contractor.

The contractor's duty is to provide a finished structure that meets the architect's specifications as outlined in the architectural drawings and which meets the requirements specified in the Uniform Building Code (UBC) and other local building ordinances. Thus where the architectural data 32 specified in the architect's drawings specifies a bearing wall 34, the architectural data will be used to by the contractor to determine what kind of structure will have to be installed in order to comply with the UBC requirements. This requirement may be, for example, that the wall contain 2×4 studs at a minimum spacing of sixteen inches. Thus the architectural data combined with the UBC requirements will only specify a certain minimum, but will not specify the optimal structural arrangement.

In FIG. 7 it been shown that according to the instant invention, the framing contractor for example, will have obtained the architectural data 32 and then proceed to the step of extracting the needed structural arrangement data 46 from the architectural data 32. This structural arrangement data 46 will generally consist of the kind of wall, for example whether the wall will be a bearing wall 34 or merely a partition type interior wall 36, and the location of windows 40 and doors 38. The structural arrangement data 46 will also include the dimensions of the walls, windows, or doors to be installed. With this structural arrangement data 46, a framing contractor would typically proceed to draw out, with a pencil, chalk lines, or other markers, the locations of the required internal structure such as the studs.

However, with the instant invention this data will be transformed into digitized data which may be later manipulated by means of computer or microprocessor implemented algorithms.

Thus, as has been illustrated in FIG. 7, in accordance with the instant invention, it is preferred that after the step of extracting the structural arrangement data 46 from the architectural data 32, it is preferred that this structural arrangement data 32 be digitized. The structural arrangement data 46 may be digitized by direct entry of the coordinate location and type of structural feature into a computer or similar device including a microprocessor and a memory.

It is also contemplated that the architectural data 32 may have been produced by the architect with the use of a computer aided design and drafting (CAD) machine which would produce the architectural data 32 in digital form. However, the even if the architectural data 32 is produced in digital form, the architectural data 32 must be processed to create the set of digitized structural arrangement data 46. This step is needed since the architectural data 32 is likely to include information which will not be immediately useful for developing a set of digitized structural arrangement data 46. For example, the architectural data may include graphics and text that is intended to be used by individuals reading prints of the drawings.

Clearly, in the event that the architectural data 32 has been developed by the architect in digital form, for example by designing the building with CAD techniques, the step of digitizing the structural arrangement data which can be used to produce the structural arrangement data 46 will be obviated, since the data will be in digital form. Often, however, the architectural data 32 may have been provided in printed paper form, or will have been generated by manual drafting techniques, which will require electronic scanning of the drawings or the entry of the location of the structural arrangement data 48 into a data processor or microprocessor based system by hand.

Once the structural arrangement data 46 in a digitized form has been obtained, either by scanning, manual entry into a digital system, or by separating the data from architectural data in a CAD format, one may then process this structural arrangement data to produce a digital representation of layouts 48 of the structural arrangement to be marked on the floor 22 of the building under construction 25. The step of processing the digital structural arrangement data is carried out under an algorithm which checks for and imposes constraints dictated by the UBC. Preferably this processing can also be carried out under an optimization algorithm which will optimize the location of structural elements within the UBC constraints. Thus, if for example the architectural data 32 calls for a wall that measures seventy four inches and the UBC requires that this wall be built with studs at sixteen inch spacings, the combined optimization algorithm and the UBC algorithm would produce a layout of the structural arrangement 48 with four studs, the first stud being installed thirteen inches from one end of the wall, a sixteen inch spacing between each stud, and thirteen inches from the last stud to the other end of the wall. Alternatively, the combined optimization algorithm and the UBC algorithm would produce a layout of the structural arrangement 48 with each stud at 14.8 inch spacings, thus producing a wall that contains better overall resistance to a running load with the same amount of material and while meeting, or exceeding, the minimum requirements of the UBC.

Moreover, the structure of the entire building may optimized by the algorithms. For example, in a three story framed building, the studs used in the bearing walls of the ground floor will likely be at eight inch spacings, or studs larger than 2×4 may be used. In order to optimize the structural efficiency of the materials to be used in this building, it would be highly advantageous to ensure that the studs at the ground level be aligned with the studs on the second floor, as well as the studs on the third floor. Thus while processing the structural arrangement data 48 to fulfil the architectural requirements and the UBC requirements for a particular building under construction 25, the system may include and optimization algorithm that will ensure that the structure to be built incorporates the required materials into the structure in an optimal manner.

Figure 6:
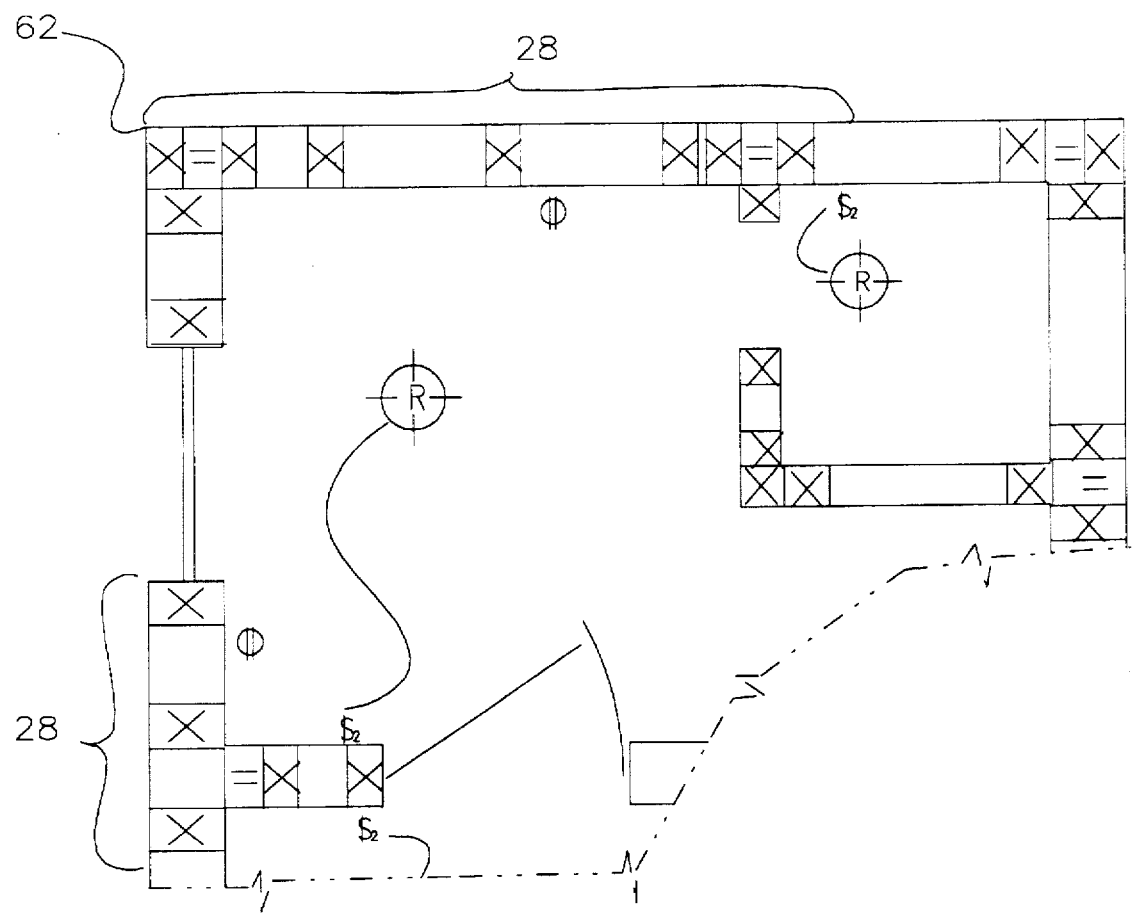
FIG. 6 shows the markings that may be produced on the floor of the building under construction by the method disclosed herein.

Thus once the arrangement of the studs has been defined by the processing of the structural arrangement data 48, the location of the studs and other structure may be printed directly on to the floor 22 of the building under construction 25. The markings may be as shown on FIG. 6, which illustrates a well known marking convention for the markings 28, where an "X" is used to indicate the center point of a stud, an "=" sign is used to indicate the location of two studs back to back, and a "C" is used to designate the location of a "cripple" or stud that does not run from plate to plate. Therefore, by using the instant invention, the framing contractor will not need to retrain his work force so that they may perform their jobs as they have been accustomed.

Importantly, the automated printing will be carried out by the marking robot or the LSR in a consistent, accurate manner, which eliminates the need for interpretation of a blueprint type drawing and which eliminates the possibility of measurement or other human error in marking. Also, since the full scale printing may be carried out off-site on sheets of material which could be overlaid on the floor 22 of the building under construction 25. Moreover, one would be able to check the printed information before placing the information over the floor 22 of the building under construction 25. Thus, in order to accurately compare and translate the makings on to the floor 22, one would also be require to establish a reference point or points which would have to be matched up with the overlay produced off-site with the marking robot 20 or the LSR machine 30.

Another important result which was not achievable with the known prior art is that once the digital representation of layouts of the structural arrangements 48 to be marked on the floor 22 of the building under construction 25 has been developed, then other trades may use this database to plan and estimate their phase of the project. Thus the electrical contractor, for example, may anticipate the precise location of the structure to be installed by the framing contractor. This will enable the electrical contractor to plan the installation and the optimal routing of the electrical systems ahead of time and incorporate into the markings to be laid out information such as the location of switches 52, outlets 54, and recessed lighting 56, as shown on FIG. 6. Moreover, once the electrical contractor arrives at the job site he will be certain that he will not have to require corrections of errors introduced by the markings from the framing contractor, and thus be able to carry out his job as planned and within schedule.

Similarly, the mechanical contractor may anticipate the precise location of the structure to be installed by the framing contractor. This will enable the mechanical contractor to plan the installation and the optimal routing of the mechanical systems ahead of time. Additionally, once the mechanical contractor arrives at the job site he will be certain that he will not have to require corrections of errors introduced by the framing or electrical contractor, and thus be able to carry out his job as planned and within schedule.

Figure 3:
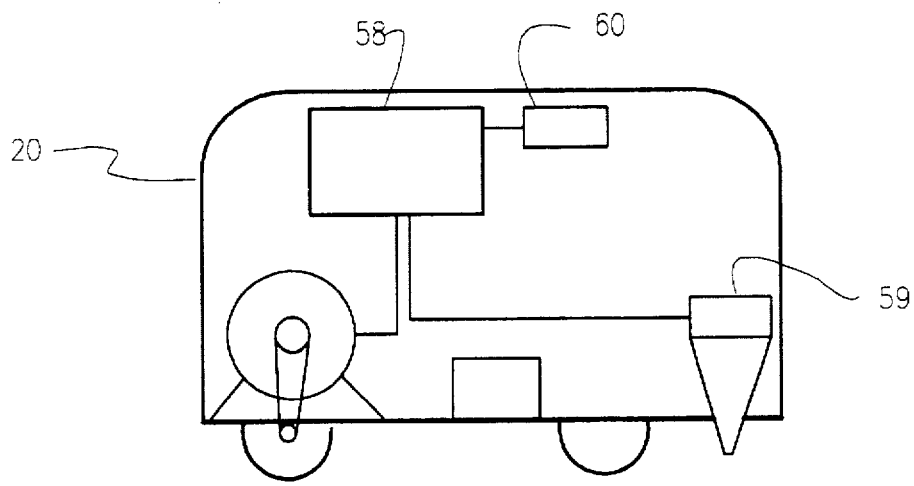
FIG. 3 is a sectional view of a possible configuration of a marking robot which may be used to automatedly mark the location of installation on the floor of the building under construction.

Since it is contemplated that the marking of the location of the structural arrangements 48 be carried out by an automated marking means such as the self propelled marking robot 20 or the LSR apparatus 30, it is also contemplated that much of the microprocessor based data processing could be carried out by a microprocessor 58 incorporated in the automated marking means as shown in FIG. 3. The use of this microprocessor would allow the input of change order data into automated marking means. With this arrangement the automated marking means would be able to store information regarding who programmed the change order and even prevent changes that are not accompanied by a valid change order authorization.

It is also contemplated that the automated marking means be equipped with a marking head 59, a data entry means 60, such as a key pad, disk reading device or other data entry device. By including a memory and a microprocessor 58 one would enable the automated marking means to carry out the steps of processing the structural arrangement data 46 under the optimization and UBC algorithms in order to produce the data needed to mark the location of installations to be built.

However, the preferred method for creating the layout markings 28 on the floor 22 of the building under construction is to load a set of print data generated from the digitized structural arrangement data 48 into the automated marking means the marking robot 20 or the LSR apparatus. With the print data, which can be created from the processing of the structural arrangement data 48, loaded into the automated marking means one may then select and mark a reference point 62 on the floor 22 which coincides a reference point selected from the digitized architectural data 32 in order to "zero in" or orientate the automated marking means. The marking of the reference point on the floor 22 may be by attaching a bar code signaling the exact location within the architectural data 32, or by attaching another physical or electronic marking means which can serve to orientate the automated marking means on the floor 22 of the building under construction 25.

Once the automated marking means has been orientated on the floor 22 of the building under construction 25, it may begin marking on the construction site with the layouts markings 28 indicating the location of installations to be incorporated into the structure. Then, once the markings 28 have been made, the construction process may continue by following the markings 28 on the floor 22.

Thus, it will be appreciated by those skilled in the art that the above described embodiments are illustrative of just a few of the numerous variations of arrangements of the disclosed elements used to carry out the disclosed invention. While the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A construction method comprising the steps of:
   providing layout markings of installation locations on a floor of a building under construction, the building having a foundation, the layout markings produced by the method comprising the steps of:
   providing a reference point on the floor of the building;
   providing an automated marking means comprising:

a first set of supports and a second set of supports, the first set of supports and second set of supports being mountable next to the foundation of the building;

a horizontal support extending between the first set of supports and the second set of supports;

a marking head support mounted on said horizontal support and extending beyond said horizontal support; and, a marking head movably mounted on said marking head support, so that the marking head can travel on said marking head support to a position beyond the horizontal support when placing markings on the floor;

providing digitized structural arrangement data for the building under construction;

computer processing the structural arrangement data to produce a digital representation of layouts of installation locations to be placed on the floor of the building under construction; and marking the layouts of the installation locations to be placed on the floor of the building under construction with said marking means in response to the digital representation of layouts of installation locations to be placed on the floor of the building under construction; and placing installations on the floor of the building under construction at the installation locations marked by the marking means.

2. A construction method according to claim 1 wherein the step of computer processing the structural arrangement data to produce a digital representation of layouts of installation locations to be placed on the floor of the building under construction further comprises the steps of:

defining the installation locations to be placed on the floor of the building under construction by processing the structural arrangement data to define installation locations to meet a set of building code requirements for the structural arrangement; and processing the installation location data to optimize the structural efficiency of the installations to be placed at the installation locations.

3. A method according to claim 2 wherein the step of marking the layouts of the installation locations to be placed on the floor of the building under construction with a marking means that places markings on the floor of the building under construction in response to the digital representation of layouts of installation locations to be placed on the floor of the building under construction comprises:

providing a printing machine to serve as the means for marking the location of installations to be installed at the construction site;

selecting a reference point from the structural arrangement data;

marking at least one reference point on the construction site;

orientating the printing machine on the construction site in relation to said reference point; and marking on the construction site with the printing machine the layouts of installation locations on the floor of the building under construction in relation to the reference point.

4. A method for marking a floor of a building under construction site, the marking serving for the placement of framing installations on the floor of the building, the method comprising the steps of:

establishing a physical reference point on the floor of the building;

providing architectural data that defines the architectural layout of the building to be constructed;

creating a set of structural arrangement data from the architectural data, the structural arrangement data including an orientation data point which corresponds to the physical reference point on the floor of the building and a set of location data defining the location of the framing installations relative to the physical reference point; and marking on the floor of the building the location of the framing installations to be placed on the floor of the building, the marking of the location of the structure being carried out relative to the physical reference point by the steps of:

providing an automated marking means comprising:

a first set of supports and a second set of supports, the first set of supports and second set of supports being mountable next to the foundation of the building;

a horizontal support extending between the first set of supports and the second set of supports;

a marking head support mounted on said horizontal support and extending beyond said horizontal support; and, a marking head movably mounted on said marking head support, so that the marking head can travel on said marking head support to a position beyond the horizontal support when placing markings on the floor; and placing markings on the floor with said marking head in response to the structural arrangement data.

5. A method according to claim 4 wherein the step of creating the structural arrangement data from the architectural data further comprises the steps of:

automatedly comparing the structural arrangement data with a set of building code requirement data to define a set of framing installation locations to meet the set of building code requirements for the structural arrangement; and processing the installation location data to optimize the structural efficiency of the framing installations to be placed at the installation locations.

6. A method for constructing a building to be constructed with a framed structure, the framed structure to be built in compliance with a set of building code requirements, the method comprising the steps of:

providing a floor for supporting the framed structure over a foundation;

establishing a physical reference point on the floor;

providing architectural data of the building;

creating a set of structural arrangement data from the architectural data, the structural arrangement data including an orientation data point which corresponds to physical reference point on the floor, the structural arrangement data created by the steps of comparing by means of a computer processor the structural arrangement data with the set of building code requirement data to define a data set of installation locations for the structural arrangement;

processing the installation location data for the structural arrangement to optimize the structural efficiency of the installations to be placed at the installation locations; and marking on the floor the installation location data for the structural arrangement, the marking of the structure being carried out relative to the physical reference point by the steps of:

providing an automated marking means comprising:

a first set of supports and a second set of supports, the first set of supports and second set of supports being mountable next to the foundation of the building;

a horizontal support extending between the first set of supports and the second set of supports;

a marking head support mounted on said horizontal support and extending beyond said horizontal support; and, a marking head movably mounted on said marking head support, so that the marking head can travel on said marking head support to a position beyond the horizontal support when placing markings on the floor; and placing markings on the floor with said marking head in response to the installation location data.

\* \* \* \* \*